United States Patent [19]
Gessner et al.

[11] Patent Number: 5,733,822
[45] Date of Patent: Mar. 31, 1998

[54] COMPOSITE NONWOVEN FABRICS

[75] Inventors: Scott L. Gessner, Encinitas, Calif.; Lloyd E. Trimble, Greenville, S.C.

[73] Assignee: Fiberweb North America, Inc., Simpsonville, S.C.

[21] Appl. No.: 514,149

[22] Filed: Aug. 11, 1995

[51] Int. Cl.$^6$ ............... B32B 5/26; B32B 7/10; B32B 25/08

[52] U.S. Cl. ............... 442/35; 156/62.4; 156/62.6; 156/308.4; 264/83; 264/172.5; 264/211.14; 264/211.17; 264/237; 428/373; 442/36; 442/57; 442/328; 442/329; 442/364; 442/381; 442/382; 442/389; 442/392; 442/398; 442/399; 442/409

[58] Field of Search ............... 428/224, 286, 428/373; 156/62.4, 62.6, 308.4; 604/385.2; 264/83, 211.14, 211.17, 237, 171; 442/35, 36, 57, 328, 329, 364, 381, 382, 389, 397, 398, 399, 409, 414

[56] References Cited

U.S. PATENT DOCUMENTS

| | | | |
|---|---|---|---|
| 4,842,922 | 6/1989 | Krupp et al. | |
| 5,108,827 | 4/1992 | Gessner | 428/219 |
| 5,281,378 | 1/1994 | Kozulla | |
| 5,318,735 | 6/1994 | Kozulla | |
| 5,431,994 | 7/1995 | Kozulla | 428/286 |
| 5,554,435 | 9/1996 | Gupta et al. | 156/62.6 |

FOREIGN PATENT DOCUMENTS

| | | |
|---|---|---|
| 391438 | 10/1990 | European Pat. Off. |
| 445536 | 9/1991 | European Pat. Off. |
| 630996 | 12/1994 | European Pat. Off. |
| 0 670 385 | 9/1995 | European Pat. Off. |
| 0 719 879 | 7/1996 | European Pat. Off. |

*Primary Examiner*—James C. Cannon
*Attorney, Agent, or Firm*—Bell Seltzer Intellectual Property Law Group of Alston & Bird LLP

[57] ABSTRACT

The present invention provides composite nonwoven fabric laminates and processes for producing such. The fabric is comprised of a web of thermoplastic filaments laminated to at least one other web. Preferably, the filaments are spunbonded continuous polyolefin filaments which have an oxidatively degraded outer sheath portion to promote better interfilamentary bonding and improved fabric laminate strength. In a preferred embodiment, two outer nonwoven webs comprise oxidatively degraded spunbonded filaments and are positioned around and laminated to a web of meltblown microfibers thus forming an spunbond/meltblown/spunbond fabric. Additionally, a stretch compatible fabric may be formed in which a web of oxidatively degraded filaments is laminated to an elastic web. The fabrics of the invention may be advantageously used in numerous applications such as medical garments and disposable adsorbent products.

7 Claims, 1 Drawing Sheet

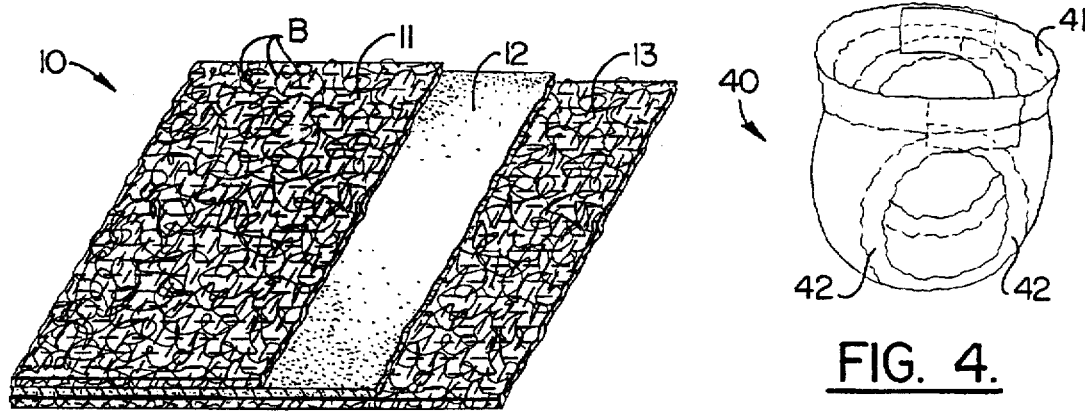
FIG. 1.
FIG. 4.
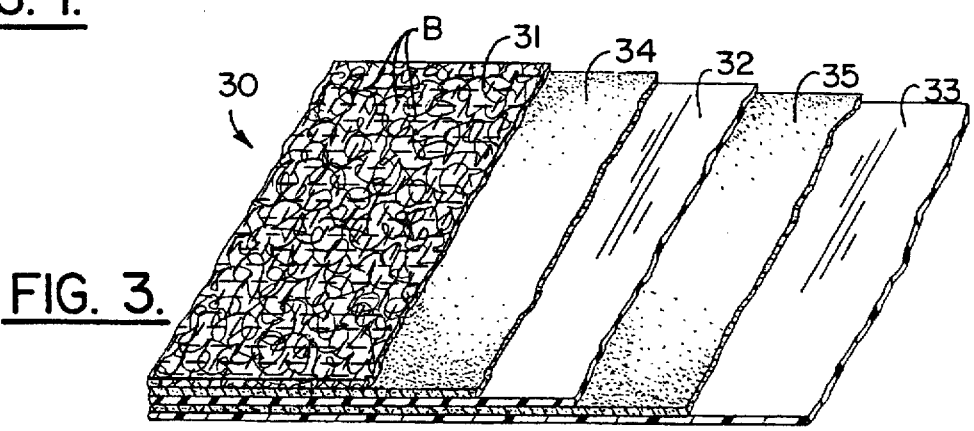
FIG. 3.
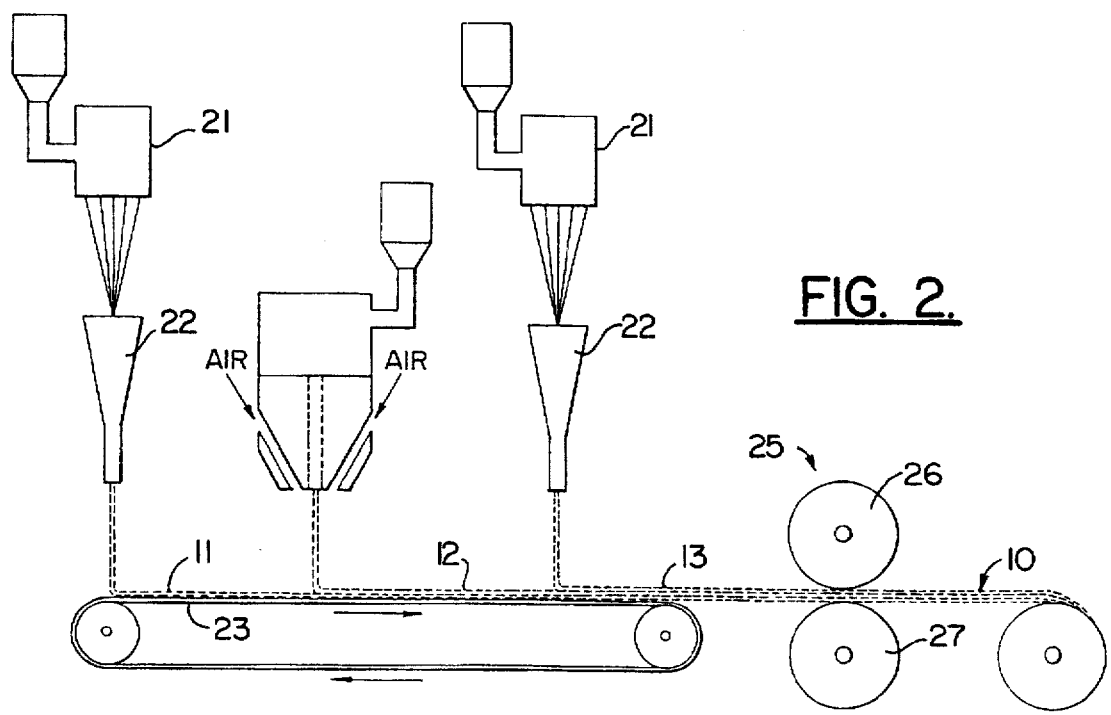
FIG. 2.

COMPOSITE NONWOVEN FABRICS

FIELD OF THE INVENTION

This invention relates to composite nonwoven fabric laminates and processes for producing such. More particularly, the present invention relates to composite nonwoven fabric laminates exhibiting desirable strength properties, and which can be manufactured by existing equipment.

BACKGROUND OF THE INVENTION

Nonwoven fabrics and fabric laminates are widely used in a variety of applications, for example, as components of absorbent products such as disposable diapers, adult incontinence pads, and sanitary napkins; and in medical garments such as surgical gowns, surgical drapes, sterilization wraps, and surgical face masks.

Nonwoven fabric laminates have been developed for a variety of specific end uses by combining two or more nonwoven fabrics of different types. For example, nonwoven fabric laminates have been developed to serve as a barrier to penetration by contaminants such as microorganisms. Barrier fabric laminates of this type typically include one or more microfibrous polymer layers, such as meltblown webs, combined with one or more layers of another type of nonwoven fabric, such as, for example, a spunbonded continuous filament fabric or a fabric of staple fibers. In laminates such as these, the outer fabrics function as strength-reinforcing layers during use, so as to protect the weaker meltblown web from excessive stresses and potential damage. Moreover, outer fabrics impart good aesthetic properties to the laminate. A widely employed fabric laminate of this type is a spunbond-meltblown-spunbond trilaminate fabric in which a meltblown layer is positioned between two outer spunbond layers as described, for example, in U.S. Pat. Nos. 4,041,203 and 4,863,785.

Additionally, by combining elastomeric nonwoven fabrics with other substantially inelastic fabrics, nonwoven elastic fabric laminates have been developed for use in personal hygiene applications. Elastic fabric laminates of this type are desirable because of their ability to conform to irregular shapes and to allow more freedom of body movement than fabrics with limited extensibility. Fabrics of this type are particularly advantageous in that the outer nonwoven layers are able to protect the user from the rubbery feel of the elastic layer while providing a soft, textile-like hand. In addition, the outer layers lend strength to the fabric laminate, and protect the elastic nonwoven component from being overly stretched to a condition where elastic properties or fabric integrity is lost.

Webs comprised of spunbonded continuous filaments or staple fibers are frequently used in nonwoven fabric laminates because they impart good strength and toughness to the composite, along with desirable aesthetic properties. An important factor in developing strength in a either a spunbonded or staple fabric is the bonding operation. Bonding serves to join the filaments of the web into a cohesive network. The bonds assist in the transfer of a load or stress to a larger population of filaments. The greater number of filaments which contribute to load bearing, the stronger the fabric.

Spinning conditions also greatly affect resulting nonwoven fabric strength properties. For example, employing high temperatures can result in "over cracked" polymer, characterized by greatly reduced molecular weight which adversely impacts web formation and strength properties. Recent efforts have focused on improving process control over polymer degradation so as to provide fabrics with improved strength and toughness. One processing condition which is of particular importance involves maintaining a polymer of lower melt flow rate (MFR) in an extruder and at the spinneret at a higher temperature (typically above 280° C.) than employed in traditional processes. As a result of the surface of the fibers being modified in such a "hot block" process, improved filament bonding is obtained and hence a stronger fabric. For example, U.S. Pat. No. 5,281,378 and European Patent Application No. 391,438 have reported producing polypropylene fabrics with improved strength and heat-bonding properties by employing "hot spun" conditions. In particular, the references focuses primarily on the production of single-layer fabrics comprised of staple fibers formed from melt-spun filaments with an oxidatively degraded sheath or surface.

The production of nonwoven fabrics comprising spunbonded continuous filaments under "hot block" conditions has yet to be fully addressed. From a processing standpoint, difficulties must be resolved which are largely absent in producing staple fiber fabrics. For example, due to the higher velocities associated with the spunbonded process, lower MFR polymers display a high resistance to draw, resulting in poor spinnability. This is especially troublesome regarding the production of fine denier continuous filaments which are very desirable in medical, hygiene, and barrier fabric applications because of the excellent combination of strength, toughness and aesthetic properties which the filaments provide. Moreover, because of the high tendency of filaments to associate and bundle together during filament distribution, proper web formation is disrupted. The resulting structure therefore tends to be nonuniform, displaying inadequate strength properties. As a consequence, the incorporation of fabrics containing such filaments into nonwoven laminates has not been successfully accomplished.

SUMMARY OF THE INVENTION

The present invention is directed to composite nonwoven fabric laminates comprising one or more webs of thermoplastic filaments which have been spun under high temperature conditions. In accordance with the invention, it has been found that the composite nonwoven fabric laminates which comprise webs of these filaments possess improved strength, toughness, and elongation properties. Accordingly, the fabrics are particularly suitable for a wide variety of end uses.

The nonwoven laminate fabric of the invention comprises a first web of thermoplastic filaments laminated to at least one other web. In accordance with the invention, the thermoplastic filaments of the first web are formed under conditions which are responsible for controlled oxidation of the outer sheath portion of the filaments. It is believed that the outer sheath portion of the filaments is oxidatively degraded since it has a weight average molecular weight which is lower relative to the filament inner portion.

A multiplicity of thermal bonds are present in the fabric laminate and formed from the oxidatively degraded outer sheath portion of the thermoplastic filaments. The thermal bonds serve to bond the nonwoven fabric to the other web to form a strong fabric laminate. Thermal bonds may also be present in the fabric laminate to bond the filaments together such that a strong coherent nonwoven web is formed.

For the purposes of the invention, the oxidatively degraded thermoplastic filaments are most preferably spunbonded polyolefin continuous filaments. Various polyolefin polymers may be used in forming the oxidatively degraded filaments. It is preferred to use those of sufficiently low melt flow rate (MFR) which perform well under such high temperature spinning conditions. A propylene polymer having a MFR of 35 g/10 min. or less is especially preferred. Blends of polymers may also be employed. Preferred blends comprise propylene polymer of low MFR as the majority component in the blend.

In accordance with the invention, the other web or webs forming the composite nonwoven fabric laminate may comprise a variety of structures including staple (e.g., carded, air laid, or wet laid) nonwoven fabrics, spunbonded nonwoven fabrics, meltblown nonwoven fabric or webs, nets, or films. In accordance with the invention, multiple fabrics, substrates and webs from those disclosed above may be arranged in a variety of sequences to impart desired properties to the composite structure. In a preferred embodiment of the invention, at least one outer layer of the multilayered composite structure is comprised of oxidatively degraded spunbond continuous filaments composed of at least one polyolefin polymer, and at least one additional layer is sandwiched between the outermost layers of the composite. The at least one additional layer can be selected from the group consisting of an impermeable film, a microporous web, or a microfibrous structure. In one preferred embodiment, the composite nonwoven fabric is a trilaminate fabric in which both outer layers comprise oxidatively degraded spunbonded continuous filaments composed of at least one polyolefin polymer, and the web sandwiched between the outer nonwoven webs is either an impermeable film, a microfibrous or microporous structure. In a most preferred embodiment, the microfibrous structure is a meltblown web. The resulting spunbond/meltblown/spunbond trilaminate fabric is highly advantageous in numerous applications, exhibiting improved strength and toughness properties relative to similar laminates formed from conventionally spunbonded fabrics.

In accordance with the invention, a preferred nonwoven fabric laminate is produced by forming a polyolefin melt of a propylene polymer having a melt flow rate of 35 g/10 min. or lower, extruding the polyolefin melt at a temperature above 250° C., and most preferably at a temperature in excess of 270° C., exposing the extruded filaments to an oxygen-containing atmosphere to allow oxidative degradation of a portion of the filament surface, directing the filaments into and through a pneumatic filament attenuator device and accelerating the filaments to a linear velocity in excess of 100 meters per minute, and most preferably to a linear velocity in excess of 1500 meters per minute, to attenuate and draw the filaments, and depositing the filaments to form a first outer continuous filamentary web. A meltblown web and a second oxidatively degraded outer continuous filament web are subsequently provided, with the meltblown web being sandwiched between the first and second continuous filament webs. The webs are thermally treated to form thermal bonds which bond the continuous filament webs to the meltblown webs such that a coherent, strong fabric laminate is formed.

In another preferred embodiment of the invention, the fabric laminate can be a stretch compatible fabric. In general, such a fabric comprises an elastic web laminated to a first web of oxidatively degraded thermoplastic filaments. In this embodiment, the oxidatively degraded filaments are preferably spunbonded continuous filaments formed of a polyolefin polymer or blend of polymers. Upon mechanical stretching, the continuous filamentary web exhibits good strength and abrasion resistance, along with improved elongation. As a result, a flexible, bonded, and textile-like fabric is obtained. In a preferred embodiment of the stretch compatible laminate, the elastic web is a film and a second web (i.e., polyolefin film) is laminate to the elastic film opposite the first web of oxidatively degraded continuous filaments. The resulting trilaminate fabric is highly desirable for use in personal absorbent articles, especially in the waist region and leg cuff components of diapers.

The composite nonwoven fabric laminates of the invention are highly desirable in a variety of uses, including those involving medical applications such as surgical gowns, surgical drapes, and sterilization wraps, as well as those involving personal absorbent products such as disposable diapers, adult incontinence pads and sanitary napkins. In accordance with the invention, the presence of the outer webs formed from the oxidatively degraded filaments are highly desirable because of improved strength and toughness properties that they impart to the composite fabric laminate.

BRIEF DESCRIPTION OF THE DRAWINGS

Some of the features and advantages of the invention having been stated, others will become apparent from the detailed description which follows, and the accompanying drawings in which:

FIG. 1 is a schematic perspective view showing a composite nonwoven fabric laminate in accordance with the present invention with the respective layers of the fabric being exposed for clarity of illustration;

FIG. 2 is a schematic illustration of a suitable apparatus for producing the composite nonwoven fabric of FIG. 1;

FIG. 3 is a perspective view showing a stretch compatible fabric laminate in accordance with the present invention with the respective layers of the fabric being exposed for clarity of illustration; and FIG. 4 is a side view of a diaper incorporating the stretch compatible fabric laminate of this invention.

DETAILED DESCRIPTION OF THE PREFERRED EMBODIMENT

FIG. 1 illustrates a composite nonwoven fabric laminate produced in accordance with the present invention, generally designated as 10. The potential uses for this fabric are numerous and include those involving disposable medical fabrics, such as surgical drapes, disposable gowns, and sterilization wraps. The fabric may also be used in applications pertaining to industrial garments, filtration media, and disposable wipes.

As shown, the fabric 10 includes first and second outer nonwoven webs 11 and 13. Sandwiched between and laminated to the outer nonwoven webs 11 and 13 is one or more additional layers or webs 12. For the purposes of the invention, at least one of the outer webs (11 for example) is formed from thermoplastic filaments whose surfaces has been modified in accordance with the invention. In particular, the filaments used to form web 11 have an outer sheath portion which has become oxidatively degraded by the elevated temperature extrusion process described more fully herein. The presence of the oxidatively degraded outer portion allows for the formation of stronger bonds and hence the production of a stronger fabric laminate. In the preferred embodiment illustrated, the web 11 is formed of continuous filaments. Most preferably, nonwoven web 11 is formed of spunbonded continuous filaments. However, many of the benefits and advantages of the present invention can realized using a web formed of filaments which have been oxidatively degraded as described herein and thereafter cut into staple fibers.

The other outer web 13 can be in the form of a variety of structures which are well known to those skilled in the art and may be formed from any of the known and suitable polymers. For example, web 13 may be a staple nonwoven web, a spunbonded nonwoven web, a meltblown nonwoven web, a film or a mat. In addition, web 13 optionally can be may be comprised of thermoplastic filaments having the oxidatively degraded outer filament portion similar to those contained in the first outer nonwoven web 11. Although a trilaminate composite laminate fabric 10 is illustrated in FIG. 1 composed of the two outer webs 11 and 13 and a single central layer or web 12, other combinations of webs can form a laminate fabric within the scope of the invention. The laminate fabric 10 may comprise two, three or more layers or components. The laminate fabric 10 may, for example, consist of a nonwoven web 11 of filaments which have been modified in accordance with the invention laminated to a polymer film.

Nonwoven web 11 may be comprised of a polyolefin polymer or blend comprising at least one polyolefin polymer, and in particular, polyolefins derived by polymerization from relatively simple olefins. The term "polymer" is used herein in a general sense, and is intended to include various homopolymers, copolymers, and terpolymers. The term "blend" is also used generally and can include all miscible and immiscible blends. The polymers or blends employed in forming the oxidatively degraded continuous filaments have a sufficiently low melt flow rate (MFR) such that the resulting filamentary web has a MFR between 5 and 100 g/10 min., and more preferably between 5 and 35 g/10 min. The MFR is determined according to ASTM test procedure D-1238 and refers to the amount of polymer (in grams) which can be extruded through an orifice of a prescribed diameter under a mass of 2.16 kg at 230° C. in 10 minutes. The MFR values used herein have units of g/10 min. or dg/min.

The polymers used in the spinning of oxidatively degraded continuous filaments can encompass a wide variety of molecular weight distributions. For the purposes of the invention, molecular weight distribution (MWD) is defined as the weight average molecular weight of the polymer, or dominant (i.e., comprising the greatest percentage) polymer in the case of a blend, divided by the number average molecular weight of the polymer or blend of polymers. Both molecular weight determinations used in calculating the MWD are made in accordance with standard procedures. Preferably, the MWD of the polymer or blend is less than 5.5. The preferred MWD range is applicable to the polymer or blend prior to being melt spun into filaments and to the polymer or blend present in the filaments of the formed web.

For the purposes of the invention, a propylene polymer (i.e., homopolymer, copolymer, or terpolymer) is typically used in forming the oxidatively degraded continuous filaments. Preferably, a propylene polymer (i.e., homopolymer, copolymer, and terpolymer) at MFR values suitable for the elevated temperatures employed during extrusion is utilized at a MFR of less than 35 g/10 min., and, more preferably, less than 20 g/10 min.

Blends of various polymers may be employed including those comprising two or more polymers. Preferably, one of the polymers is a polyolefin. In the case of blends of two polymers, it is preferred that one of the components be the majority component and the other be the minority component. In such instances, numerous polymers may serve as the majority component including polyolefins, and polycondensate polymers such as, but not limited to, polyesters and polyamides. For the purposes of the invention, polyolefins are preferred including, but not limited to, a propylene polymer (e.g., homopolymer, copolymer, or terpolymer), a polymethyl pentene (TPX), a polymethyl pentene copolymer, and an ethylene-propylene copolymer. Numerous polyolefins can be employed as the minority component, including, for example, those polymers which are soft and elongatable. Preferred polymers of this type include standard ethylene polymers made by Ziegler-Natta or high pressure techniques. Commercially suitable soft, elongatable polymers include the Catalloy polyolefins available from Himont Incorporated, the Exact Series of polymers available from the Exxon Chemical Company, and the Affinity polymers available from the Dow Chemical Company.

For the purposes of the invention, a propylene polymer having low MFR values herein described is preferred as the majority component in the blend. One preferred blend comprises about 1 to 50 percent by weight of an ethylene polymer and 99 to 50 percent by weight of a propylene polymer. More preferably, the blend comprises about 2 to 10 percent by weight ethylene polymer and about 98 to 80 percent by weight propylene polymer. High density polyethylene is preferably employed in the above compositions. Several other preferred blends may also be utilized. For example, one blend may comprise polybutene from 1 to 50 percent by weight and 99 to 50 percent by weight propylene polymer having the melt flow rate value range listed above. Other preferred blends comprise an ethylene-propylene copolymer. For example, one blend comprises an ethylene polymer from about 1 to 50 percent by weight and an ethylene-propylene copolymer from about 99 to 50 percent by weight having a melt flow rate of less than 15 g/10 min. Another preferred blend comprises polybutene from 1 to 50 percent by weight and 99 to 50 percent by weight of ethylene-propylene copolymer having the MFR range listed above.

Blends with more than two polymers may also be employed, including those with three and four components. Additional polymers may be added to a two-component blend to have an effect, for example, on blend compatibility, viscosity, polymer crystallinity, or phase domain size. A preferred category of such blends are those comprised of a dominant low MFR propylene polymer component, a separate ethylene component, and at least one additional polymer component selected from the following: polybutenes (e.g., Shell Duraflex polymers and copolymers), Catalloys (i.e., co and terpolymers of propylenes), polyvinyl acetates, acrylates (e.g., polymethacrylate, polymethylmethacrylate), acrylic acid copolymers, grafted copolymers of ethylene or propylene (e.g., maleic anhydride grafted onto polyethylene), polylactic acids, and thermoplastic starch-based polymers.

Stabilizers or antioxidants are conventionally added to the polyolefin polymer and polymer blend since these components almost universally undergo some level of degradation in the extrusion process. The level and kind of stabilizer/antioxidant can affect the degree to which the polymer or blend undergoes degradation. The stabilizer/antioxidant concentration in the polyolefin polymer or blend typically may range from 0–1% by weight. When present, the antioxidant/stabilizer is preferably within a range of about 0.005%–0.5%. Antioxidant/stabilizer compositions which can be used include at least one composition selected from the group consisting of organic phosphites, organic phosphonites, hindered phenols, and hindered amines. Examples of such compositions include phenylphosphites such as Sandostab PEP-Q from Sandoz Chemical Co., distearyl pentaerythritol diphosphite (DSTDP); phenol substituted nitrogen heterocyclic compounds, e.g. Goodrite 3114; N,N'bis-piperidinyl diamine-containing compositions; hindered amine stabilizers such as 1,2,2,6,6-pentamethyl piperidines. More specific examples of antioxidant/stabilizer compositions which may be used in the polymers for this invention are disclosed in published European Patent Application, EP 391,438, which is incorporated herein by reference. Other additives conventionally used in the production of continuous polymer or polymer blend filaments can also be incorporated in the polymer such as antiblocking agents, impact modifiers, plasticizers, UV stabilizers, pigments, delusterants, lubricants, wetting agents, antistatic agents, nucleating agents, water and alcohol repellants, etc, in the conventional amounts, which are typically no more than about 10% by weight.

The polymer or polymer blend continues to undergo thermo-oxidative and photo-oxidative degradation after exiting the extrusion die. At the elevated extrusion temperatures used in the present invention, it appears that an oxidation reaction occurs on the surface of the molten filaments, which forms an oxidized sheath on the cooled filaments. Oxidation of the filament surface activates the surface so that it assists in bonding and retention of topical additives, such as surfactants, water or alcohol repellants, printing inks, and the like.

The process parameters which control the polymer or polymer blend surface oxidation include the following:

1. Extrusion temperature;
2. Extrusion shear;
3. Extrusion residence time (time at temperature);
4. Presence of oxygen in the extrusion process;
5. Die temperature;
6. Extruded polymer or polymer blend temperature;
7. Spinneret capillary diameter (affects die swell, surface to volume ratio, and time at elevated temperatures);
8. Polymer or polymer blend capillary throughput (grams/minute/hole);
9. Oxidizer (oxygen) concentration beneath the die and in the draw zone;
10. Temperature of the draw zone area;
11. Draw rate.

The oxidation reaction is complex, since the key process variables are constantly changing in any moderate to high speed spunbonding operation. For example, filament temperature (and therefore time at temperature), density and diameter (and therefore surface to volume ratio) are changing constantly and non-linearly between the capillary exit and the freeze point of the spinline. The concentration of active stabilizer changes as it reacts with diffused oxidizer. Also, the polymer or polymer blend is constantly changing as it reacts, is drawn, and cools. However, these process parameters can be manipulated in order to achieve a desired controlled degree of surface oxidation for various polymers with various stabilizer levels. In accordance with the invention, a highly stabilized, high molecular weight polymer or polymer blend can be processed through manipulation of process parameters 1 to 11 above to preferably produce fine denier (i.e., less than 10) spunbond nonwoven fabric with excellent filament bonding.

Die temperature affects the temperature of the polymer or polymer blend just before it is exposed to the atmosphere below the die. The temperature of the polymer or polymer blend as it exits the die capillary, and before it is significantly quenched, will affect the rate of oxidation. The higher the temperature of the polymer or polymer blend melt, the more rapid the oxidization. For moderately stabilized polymers and blends, the die temperature is preferably about 250° C., and for highly stabilized polypropylene polymers and blends thereof, the die temperature is preferably above 270° C., and most desirably within the range of 285° C. to 320° C.

At constant capillary throughput, larger capillary diameters, or capillary cross-sectional areas in the case of non-cylindrical capillaries, will decrease the polymer or blend linear velocity in and just beneath the die. This increase in polymer or polymer blend residence time in and near the die, where the polymer blend temperature is at its peak, has a significant affect on the extent of oxidation. While smaller diameter capillaries may create higher die swell, which in turn decreases the linear velocity, this effect tends to reduce the surface to volume ratio. Therefore capillary diameters must be balanced with other materials and process conditions. Larger diameters will, however, tend to increase the extent of oxidation. Preferably, to achieve optimal levels of oxidation, the spinneret capillaries are from 0.4 to 1.2 mm, and most preferably between about 0.6 to 1.0 mm, or have a cross-sectional area from about 0.2 to 1.2 $mm^2$.

Capillary throughput affects the polymer or polymer blend linear velocity just beneath the die, and can therefore affect the extent of oxidation for reasons similar to those given above. Throughput also affects the extent of oxidation indirectly, by having an affect on the total mass of the material to be oxidized and the die swell. Higher polymer or polymer blend throughput, in general, will tend to reduce the extent of oxidation. Preferably, the polymer or polymer blend throughput is within the range of 0.1 to 5 grams/minute/hole for spinning speeds of about 100 to 10,000 meters/minute, and most preferably from 0.5 to 2.0 grams/minute/hole for spinning speeds of about 1500 to 500 meters/minute.

The concentration of oxygen or other oxidizing gases just below the die and in the draw zone will affect the rate and extent of oxidation. If the cooling rate of the extruded molten filament is retarded, the time it spends at elevated temperature is increased, giving it more time to oxidize. Draw zone conditions (e.g. quench temperature, quench and smoke removal flow rate) should have an affect on the extent of oxidation. Generally, slower quenching will increase the extent of oxidation.

Draw rate can affect oxidation in several ways. Higher draw rates increase the surface to volume ratio of the molten polymer or polymer blend strand, by rapidly decreasing filament diameter. However, the increased surface to volume ratio also increases the rate at which the filament is quenched.

Generally, more highly stabilized polymers and blends will require one or more of the following process adjustments: higher extrusion temperature; higher shear extrusion; longer extrusion resident time; higher melt temperature at the die; larger capillary diameter; delayed quenching. For polymers that contain less stabilizer, some or all of these condition may be reversed. For polymers or blends whose stabilizers are inactivated in the extrusion process, die temperature and capillary diameters would be similar to those of less stabilized polymers.

The central layer or web 12 may comprise a variety of structures, such as, but not limited to, a staple fiber web or fabric (e.g., a carded, air-laid, or wet-laid web or fabric), a spunbonded nonwoven fabric, a microporous structure such as a meltblown web of microfibers, a net, and a film. These structures are formed from polymeric materials by processes known to the skilled artisan. In a preferred embodiment, a web of meltblown thermoplastic microfibers is employed so as to provide fabric laminate with good barrier properties. The meltblown microfibrous web 12 is suitably manufactured as described in U.S. Pat. No. 3,849,241 to Buntin et al., incorporated herein by reference. The meltblown microfibers typically have an average diameter of up to 10 microns with very few, if any, of the fibers exceeding 10 microns in diameter. Usually, the average diameters of the fibers will range from 2 to 6 microns. A typical meltblown web has a basis weight ranging from 2 to 100 grams per square meter. Examples of polymers which may be used in forming meltblown webs include polyesters, polyamides, polyolefins such as polyethylene and polypropylene, and the like, along with copolymers and blends of the foregoing.

In addition, outer nonwoven web 13 may also be in the form of any of the above-noted structures which are well known to the skilled artisan. In the embodiment as shown in FIG. 1, web 13 preferably comprises spunbonded polyolefin continuous filaments, and the fabric laminate 10 thus comprises a spunbond/meltblown/spunbond trilaminate fabric. Most preferably, the spunbond continuous filaments of web 13 have an outer sheath portion which has become oxidatively degraded in the manner earlier described herein.

A method for forming a fabric laminate 10 according to the invention is shown schematically in FIG. 2. A continuous filament web 11 is formed by extruding molten thermoplastic polymer in the form of filaments from an extruder 21, pneumatically attenuating and drawing the filaments in an attenuator device 22, and depositing the attenuated and drawn filaments onto a collection surface 23. The continuous filaments are melt spun under conditions described herein such that the filaments become oxidatively degraded. The continuous filament web 11 may be optionally transported to a thermal treatment station (not shown) where, under known and suitable processing conditions, a multiplicity of thermal point bonds are formed from the oxidatively degraded outer sheath portion of the continuous filaments. As a result, a strong coherent nonwoven fabric web is formed.

The continuous filament nonwoven web 11 is transported by known and appropriate means to a location where an additional web 12 is provided. In a preferred embodiment, a web of meltblown microfibers is deposited directly on web 11. Alternatively, the meltblown web 12 may be unwound from a storage roll and directly placed on the nonwoven web 11. Subsequently, an outer nonwoven web 13 is provided and placed on top of meltblown web 12 so as to sandwich the web 12 between the nonwoven web 11 and web 13. In the embodiment shown, web 13 is a continuous filament spunond web, the filaments thereob being produced with an oxidatively degraded sheath portion as described earlier. The continuous filament web 13 optionally may be thermally treated to thermally bond the filaments together to form a coherent nonwoven web 13.

The three-layered structure is transported to a thermal treatment station 25 comprised of a pair of cooperating calender rolls 26, 27 where thermal bonds are formed which bond and laminate the nonwoven webs 11 and 13 to the meltblown web 12 such that a spunbond/meltblown/spunbond laminate 10 is formed. It should be noted that alternative methods may be utilized in forming the spunbond/meltblown/spunbond laminate 10. For example, layers of suitable and known adhesive may be applied to nonwoven webs 11 and 13 and/or meltblown web 12, with a composite nonwoven fabric laminate being formed by an appropriate technique.

In another embodiment of the present invention, illustrated in FIG. 3, composite nonwoven fabric laminate 30 may be a stretch compatible fabric which is desirable in absorbent product applications including disposable diapers, adult incontinence pads, feminine hygiene garments, and the like. In general, first outer nonwoven web 31 comprises thermoplastic filaments having an oxidatively degraded outer sheath portion produced in accordance with the invention. As shown, the first outer web 31 is laminated to an elastic web 32. Laminated to elastic web 32 opposite web 31 is a second outer nonwoven web 33, which can comprise any known polymeric structure. Although FIG. 2 depicts a trilaminate stretch compatible structure, it should be understood that other configurations may exist within the scope of the invention. For example, a two-layered fabric may be employed in which an outer nonwoven web comprised of oxidatively degraded thermoplastic filaments is laminated to an elastic film. Additionally, structures employing more than three webs may be utilized.

First outer web 31 can exist in the form of various structures such as a staple fiber web or a web of continuous filaments. Most preferably, web 31 comprises spunbonded polyolefin continuous filaments produced in accordance with the process of the present invention.

Elastic web 32 can exist in various forms including a web of bonded filaments, a net, film, foam, parallel arrays of filaments, and the like. Preferably, an elastic film is employed. All of the above structures are produced by conventional methods known to the skilled artisan. Also as known, any suitable elastomeric forming resins or blends thereof may be utilized in producing these structures. Such suitable materials include the diblock and triblock copolymers based on polystyrene (S) and unsaturated or fully hydrogenated rubber blocks. The rubber blocks can consist of butadiene (B), isoprene (I), or the hydrogenated version, ethylene-butylene (EB). Thus, S—B, S—I, S—EB, as well as S—B—S, S—I—S, and S—EB—S block copolymers can be used. Preferred elastomers of this type include the KRATON polymers sold by Shell Chemical Company or the VECTOR polymers sold by DEXCO. Other elastomeric thermoplastic polymers include polyurethane elastomeric materials such as ESTANE sold by B. F. Goodrich Company; polyester elastomers such as HYTREL sold by E. I. Du Pont De Nemours Company; polyetherester elastomeric materials such as ARNITEL sold by Akzo Plastics; and polyetheramide materials such as PEBAX sold by Elf Atochem Company. Blends of these polymers with other thermoplastic polymers, such as, for example, polyolefins may be employed to enhance processing such as decreasing melt viscosity, allow for lower melt pressures and temperature and/or increase throughput. Additionally, well known thermoset elastomers may be employed in the film, net or foam. In general, the elastomer may be "set" (i.e., sufficiently crosslinked) by numerous known methods including, but not limited to, vulcanization (sulfur crosslinking of isoprene), methyl condensation peroxide crosslinking, and ionizing radiation.

As shown in FIG. 3, a second outer web formed of polymeric material 33 is utilized on the side of elastic web 32 opposite first outer nonwoven web 31. Any suitable material may be employed including, but not limited to, that which is herein described. In a preferred embodiment, web 33 is a thermoplastic polyolefin film with preferred polymers being propylene polymer, ethylene polymer, or blends thereof. For the purposes of the invention, it is preferred that the polymer film be substantially impervious to liquids such that laminate fabric 30 may be suitably employed in disposable absorbent products such as diapers, training pants, incontinence briefs, feminine hygiene products, and the like.

Fabric laminate 30 may be produced in accordance with any of the well known thermal or chemical methods, including any of the known thermal spot bonding techniques or adhesive bonding. Preferably for the purposes of the invention, adhesive is employed. In a preferred embodiment, prior to the lamination process being carried out, the oxidatively degraded continuous filaments are melt spun under conditions described herein and thermally bonded so as to form laminate fabric 30.

In a preferred example, outer web 31, elastic web 32, and web 33 may be provided in an untensioned, non-elongated state from individual supply rolls. Adhesive is then applied to discontinuously or continuously cover the opposed surfaces of elastic web 32 or the surfaces of webs 31 and 33 adjacent the elastic web so as to form adhesive layers 34 and 35. As shown in FIG. 3, adhesive layer 34 is positioned between elastic web 32 and nonwoven web 31, while adhesive layer 35 is positioned between elastic web 32 and web 33. Any of the well known adhesives may be employed including, for example, hot melt adhesives and aqueous or organic solvent-based adhesives. Suitable adhesives can be made from a variety of well-known materials including polyolefins, polyvinyl acetate polyamides, hydrocarbon resins, waxes, natural asphalts and blends thereof.

Soon after the adhesive is applied, the webs are brought into contact such that elastic web 33 is sandwiched between web 31 and web 32. The layers are then subjected to suitable pressure (e.g., nip rolls) such that the adhesive bonds the webs together forming a coherent composite fabric laminate 30.

Subsequent to lamination, stretching forces may be applied to fabric laminate 30 imparting elastic properties in the machine direction (MD) and/or cross machine direction (CD). Numerous well-established techniques may be employed in carrying out this operation. For example, a common way for obtaining MD stretch is to pass the fabric through two or more sets of nip rolls, each set moving faster than the previous set. CD stretch may be achieved through tentering. Other known means may be also be employed.

Upon application of the stretching forces on fabric laminate 30, continuous filaments within web 31 orient in the direction of the stretching forces so as to experience tension with the fabric 30. As a result, the continuous filaments undergo deformation. In most instances, the filaments are stretched past their elastic limit and become permanently elongated. In accordance with the invention, the continuous filaments produced under high temperature spinning conditions are observed to undergo higher levels of elongation relative to continuous filaments spun under conventional conditions so as to experience less rupture. Moreover, because of the high interfilamentary bond strength, the continuous filaments remain tied-down to the web structure. As a result, fabric laminate 30 exhibits good strength, coherency, and abrasion resistance properties.

The composite nonwoven fabric laminates produced in accordance with the invention are highly desirable. In particular, the disclosed spunbond/meltblown/spunbond fabrics display increased strength and toughness due to the improved bonding between the continuous filaments. The fabrics are exceptionally well suited for use as components in a vast array of products such as surgical gowns, surgical drapes, sterilization wraps, surgical face masks, industrial garments, carpets, and filtration media.

The composite nonwoven fabric laminates which exhibit elastic properties are particularly advantageous for use in various disposable garments such as diapers, training pants, incontinence briefs, and feminine hygiene products since they possess desirable levels of elongation, strength, and abrasion resistance. For example, the fabric laminate may be utilized in a diaper, such as the one illustrated in FIG. 4 (denoted as 40) having waist region and leg cuff components (41 and 42, respectively). Since the stretch compatible fabric possesses these properties, strength, and soft, textile-like feel, the diaper 40 is able to withstand the rigorous movement of the wearer without rubbing or chafing the wearer's skin during use.

The invention, and how to make and use the same, will be understood more completely from the examples which follow, which are intended to be illustrative of the invention, but not to limit the scope of the invention.

EXAMPLE 1

A standard hygiene spunbond-meltblown-spunbond fabric was formed in accordance with the following general procedure. Outer layers of spunbonded filaments were formed by blending 90% polypropylene (Appryl, 25 MFR), 8% high density polyethylene (8 MI), and 2% pigment at a temperature of 252° C. The melt blend was extruded and drawn into continuous filaments which were deposited to form a web. The resulting spunbonded web was bonded into a fabric with a heated calender (oil temperature 145° C.). Capillary throughput and draw force were balanced to yield a 3 Dtex continuous filament fabric. The fabric was subsequently stored on a "back-stand" roll.

A second spunbonded fabric was produced as described above and stored on a similar roll. One of the spunbonded rolls was unrolled from the "back-stand" onto a porous conveyor belt.

Thermoplastic material was melted at 515° F. and melt spun into a web of meltblown microfilaments under the following conditions:

Line Speed: 62 mpm

Melt Blown Melt Temperature: 515° F.

MB Air Temperature: 518° F.

MB SCFM/inch: 22.7

MB Weight: 14 gsm

Calender Temp.: 285° F.

DCD (distance from MB die to Table): 12.5 inches

The web of meltblown microfilaments was deposited onto the moving spunbond layer. The second roll of spunbond fabric was unwound on top of the spunbond/meltblown layers. The three layers were thermally bonded at a temperature of 285° F. forming a spunbond/meltblown/spunbond trilaminate fabric.

Grab, strip, and tear properties are listed in Table 1.

EXAMPLES 2-6

Various trilaminate fabrics were prepared according to similar conditions as outlined above with the following exceptions: (1) 100% polypropylene polymer (Appryl 3130, 13 MFR) was used in forming spunbonded filaments. (2) Spunbond filaments were extruded at a melt temperature of 280° C., and (3) the spunbond webs were bonded at approximately 138° C. Production and storage of the spunbond fabrics were similar to that described in Example 1. Trilaminates were prepared on the same machine under approximately identical machine conditions as for Example 1.

Grab, strip, and tear properties are reported in Table 1. The laminate fabrics produced in accordance with the invention generally displayed superior strength and toughness relative to Comparative Example 1.

In the examples, the presence of the oxidative degradation in the outer sheath portion of the continuous filaments in the nonwoven webs was believed to exist due to a relative reduction of weight average molecular weight in the oxidized sheath portion, relative to the weight average molecular weight of the inner filament portion. With respect to polymer blends, it is believed that at least one of the polymer components in the oxidized sheath portion experiences a reduction in weight average molecular weight. Preferably, the oxidized outer sheath portion has a weight average molecular weight of less than 100,000, and more preferably, less than about 50,000. The inner filament portion preferably has a weight average molecular weight ranging from 250,000 to 400,000; in the case of polymer blends, the dominant polymer component in the inner filament preferably has the above weight average molecular weight range. In accordance with the invention, the continuous filaments in the fabric laminates of the invention reveal a softened or melted coating which appears to adhere the filaments together. It is theorized that the oxidized surface is acting like a sheath/core bicomponent with the oxidized sheath component forming an improved bond at a temperature below that which might cause a loss in filament core properties.

TABLE 1

TRILAMINATE GRAB, STRIP, AND TEAR PROPERTIES

| Example Number | Mullen Burst (PSI) | RMS GRAB** (lb) | RMS STRIP** (lb) | RMS TEAR** (lb) |
| --- | --- | --- | --- | --- |
| 1 (comparison) | 28.7 | 17.8 | 7.6 | 9.2 |
| 2 | 40.9 | 26.4 | 9.6 | 9.6 |
| 3 | 41.6 | 27.2 | 10.9 | 9.7 |
| 4 | 44.2 | 31.4 | 11.0 | 10.5 |
| 5 | 41.8 | 26.7 | 10.5 | 9.2 |
| 6 | 43.8 | 25.0 | 9.4 | 8.3 |

RMS = Root Mean Square of MD & CD Values.
*Basis Wt. = ~20 gsm MB, ~15 – 18 gsm original SB
**Values standardized to a basis Wt. of 47.5 gsm (1.4 osy).

The invention has been described in considerable detail with reference to its preferred embodiments. However, it will be apparent that numerous variations and modifications can be made without departure from the spirit and scope of the invention as described in the foregoing specification and claims.

What is claimed is:

1. A composite nonwoven fabric comprising:

an outer nonwoven web comprising spunbonded continuous polyolefin filaments, said filaments comprising a propylene polymer of melt flow rate of 35 g/10 min. or lower and having an oxidatively degraded outer sheath portion of weight average molecular weight of less than 50,000, and said web comprising a multiplicity of thermal bonds formed from the oxidatively degraded outer sheath portion of said continuous filaments bonding the filaments together to form a continuous filament nonwoven fabric;

a polyolefin film;

an elastic film sandwiched between and bonded to said nonwoven web and said polyolefin film.

2. A composite nonwoven fabric according to claim 1, including an adhesive layer positioned between said elastic film and said outer nonwoven web, and another adhesive layer positioned between said elastic film and said polyolefin film, said adhesive layers laminating said elastic film, said nonwoven fabric, and said polyolefin film together to form a coherent composite fabric laminate.

3. A diaper having waist, side, and leg cuff components, at least one of said components comprising a composite nonwoven fabric laminate according to claim 1.

4. A composite nonwoven fabric laminate comprising:

a first nonwoven web comprising thermoplastic filaments, said filaments having an oxidatively degraded outer sheath portion; and an elastic web laminated to said first nonwoven web, said fabric laminate existing in an untensioned, non-elongated state.

5. The laminate according to claim 4, wherein said elastic layer comprises a substantially continuous elastic film.

6. The laminate according to claim 4, wherein said filaments are spunbonded continuous polyolefin filaments.

7. A composite nonwoven fabric laminate comprising:

a first nonwoven web comprising thermoplastic filaments, said filaments having an oxidatively degraded outer sheath portion and having been permanently elongated by mechanical stretching; and an elastic web laminated to said first nonwoven web, said fabric laminate exhibiting elastic properties.

* * * * *